Patented June 28, 1927.

1,634,124

UNITED STATES PATENT OFFICE.

MERWYN C. TEAGUE, OF JACKSON HEIGHTS, NEW YORK, ASSIGNOR TO AMERICAN RUBBER COMPANY, OF EAST CAMBRIDGE, MASSACHUSETTS, A CORPORATION OF MASSACHUSETTS.

METHOD OF THICKENING AND STABILIZING LATEX AND PRODUCT.

No Drawing. Original application filed June 9, 1924, Serial No. 719,015. Divided and this application filed September 30, 1925. Serial No. 59,595.

This invention relates to a method of thickening and stabilizing latex and to the product thereof, more particularly for use in coating and extruding.

In the making of rubberized articles by a coating operation, such as by spreading or dipping, it has been common for many years to use a solution of broken-down or milled rubber in a volatile solvent to form the doughs and cements which are applied to the material to be rubberized to form a coating thereon. For extruding purposes it has been necessary to use milled rubber which has been softened sufficiently by heat and compounding to possess the desired fluidity and plasticity.

Owing to the fact that the rubber compounds used for coating must be varied to some extent in accordance with the particular purpose for which they are designed, and also owing to the fact that the compounds must be differently colored for different purposes, it is necessary to make up a considerable number of different batches in the factory. As such compounds can be most economically made up in large quantities and it is desirable to have a stock of each compound used always on hand for convenience and speed in manufacture, it has been customary to mix up such cements and doughs in large batches.

Recently there has been considerable development in the use of rubber latex as such for coating by spreading and dipping. However, as is well known, latex consists of a sensitive and easily coagulated emulsion of the rubber particles in an aqueous continuous phase, and, owing to its fluidity, it is unsuitable in its natural condition for certain coating purposes such as where it is desired to prevent impregnation of the material being coated. In addition, by reason of its fluidity it cannot be successfully used with the present types of spreader machines operating with a relatively viscous and thick dough of broken down or milled rubber, nor can it be used for extruding purposes where a thick, plastic compound is required. By compounding the latex with certain inert fillers it is possible to obtain it in a sufficiently thickened condition to use for some coating operations, but such thickened compounds become quite sensitive to rubbing or handling and will frequenty coagulate before or during use. Certain chemicals also act to thicken the latex, but after standing a few hours they render it sensitive and easily coagulated. It has also been possible by the use of certain substances such as glue or gelatine to obtain the desired thickening as well as a certain amount of stability, but in order to obtain this result it has been necessary to add these substances in such an excessive amount that undesirable properties are imparted to the finished material, such as lack of flexibility and poor aging properties. Hence, due to these characteristics of latex it has not been practically possible prior to my invention to produce a latex thickened sufficiently for spreading and extruding and which at the same time has sufficient stability to enable it to be made up in large batches and kept for a reasonable length of time or until used.

An object of my invention is to provide a process for both thickening and stabilizing latex without coagulation thereof.

Another object is to provide a process for thickening and stabilizing latex without substantial modification of its protein content.

Still another object is to provide a process for thickening and stabilizing latex without coagulation, by physical action.

A further object is to provide a thickened and stabilized uncoagulated latex without the addition thereto of substances undesirable in themselves or imparting undesirable properties to the finished product.

For a detailed disclosure of the nature and objects of the invention reference is had to the accompanying specification and claims.

The invention consists broadly in the addition to latex of a substance or substances capable of both stabilizing the latex and thickening it to any desired degree, without coagulation thereof and without imparting undesirable properties to the finished product. The invention also comprises the product obtained.

This invention is a division of copending application Serial No. 719,015, filed June 9, 1924.

The copending application Serial No.

719,015, filed June 9, 1924 sets forth stabilizing and thickening rubber latex by the addition of metallic elements in the form of chemical compounds such as salts of lead, bismuth, iron, etc. These salts may react to a slight extent with the water soluble protein constituents in the latex, but their reacton is chiefly with the water soluble constituents exclusive of the proteins. In the present application, which is a division of the above mentioned specification, substantially the same effect of thickening and stabilizing may be obtained by the physical action of certain materials such as ammonium or substituted ammonium soaps and saponification products.

The soaps are added to the latex in sufficient quantity to produce a thickened condition, which may be accomplished by adding from 5 to 40 parts of the soap to 100 parts of rubber as latex, but I do not wish to be limited to the maximum given, as very large quantities may be added for certain purposes. While potassium or sodium soaps also have a thickening and stabilizing action the addition of large quantities of these is often objectionable by reason of the introduction of the alkali metals, but in the case of ammonium soaps and saponification products there is no such difficulty as during the drying operation after application of the latex to its purpose the ammonium compound is decomposed with evolution of ammonia gas and leaves the free aliphatic acid (or acid and glycerol as the case may be) uniformly distributed in the rubber compound. Among the ammonium soaps or saponification products suitable for use are those with stearic or similar acids of the fatty acid series, oleic and similar acids, and also the compounds with cocoanut, cotton seed, palm, linseed, and corn oils.

An example of such a thickened and stabilized latex compound suitable for spreading on fabrics is the following: 100 parts rubber (as 60% solids latex), 5 parts glue, 0.6 part ultramarine blue, 200 parts lithopone, 22 parts ammonium compound of cocoanut oil (dry basis), 1 part zinc oxide, 3 parts sulphur, 0.5 part zinc dimethyl-dithiocarbamate.

Another similar example is as follows: 100 parts rubber (as 60% solids latex), 100 parts lithopone, 75 parts barytes, 10 parts glue, 7 parts ammonium stearate (dry basis), 0.5 part ultramarine blue, 1 part zinc oxide, 3 parts sulphur, 0.5 part zinc dimethyl-dithiocarbamate.

As an example of a physically thickened and stabilized latex compound, using normal latex, the following is given: 100 parts rubber (as normal latex containing about 33% rubber by weight), 35 parts of the ammonium compound of linseed oil by weight), 3 parts sulphur by weight, 125 parts whiting by weight, 5 parts glue by weight, 1 part zinc oxide by weight, 0.6 part ultramarine blue by weight, 0.5 part zinc dimethyl-dithiocarbamate by weight.

The above compounds may be vulcanized in air in two hours at 212° F.

In still another form of the invention it has been found that latex may be thickened and stabilized by the addition thereto in suitable proportions of saponin, and the following is given as an example of the use of this thickening and stabilizing agent, using 60% concentrated latex. 100 parts rubber by weight (as 60% solids latex), 200 parts lithopone by weight, 1 part saponin by weight, 0.5 part ultramarine blue by weight, 1 part zinc oxide by weight, 3 parts sulphur by weight, 0.5 part zinc dimethyl-dithiocarbamate.

The above compound may be cured, in air in two hours at 212° F.

It will be seen by the use of my invention a thickened and stabilized latex can be produced by the addition thereto of one or more of the agents mentioned, to provide a latex suitable for such purposes as extruding, spreading or dipping, without the introduction of any materials which are injurious in themselves or impart injurious properties to the finished product. Moreover, when it is not desired to use a concentrated latex the normal latex may be used instead.

In all forms of the invention a thickening and stabilizing non-protein substance is added to the latex, and in the case of the saponification compounds the compound is decomposed subsequently to its addition and includes a basic substance. In the case of the physically acting saponification compound it is decomposed by the removal of the volatile base when the latex is converted into rubber. In all forms of the invention a stabilized latex is obtained, and as before stated by varying the concentration of the latex, the quantity and kind of filler, the water, and the quantity and kind of stabilizing and thickening agent any desired degree of thickening may be obtained. Therefore by the use of my invention it is possible to make up latex compounds which will keep for considerable periods of time and the consistency of which may be varied as desired to adapt them for various purposes such as dipping, spreading, extruding, etc. My invention therefore greatly enlarges the field of use for rubber latex as such, and at the same time allows in many cases, such as the spreader machines previously mentioned, the use of the same apparatus as was formerly used with compounds prepared from milled rubber. As even a thick and viscous rubber cement contains a relatively small amount of rubber as compared with latex of very much less viscosity, it will be seen that by the use of the product of my method a relatively large quantity of rubber can when desired be applied as a coating in a single operation. Moreover the use of inflammable and expensive organic solvents is done away with, and the coating obtained from the latex is of superior strength and curing qualities and also is bonded with much greater tenacity to the fibrous or other material to which the coating is applied. Rubberized fabrics and similar materials coated with the product of my invention, or articles formed by extrusion, possess the advantages of great flexibility, good appearance, improved aging qualities and low cost.

While specific examples of the invention have been given it is obvious that it is capable of modification and it is not desired to limit it to the particular examples given or to the specific agents described, otherwise than as defined in the appended claims.

Having thus described my invention, what I claim and desire to protect by Letters Patent is:

1. The process of treating latex which comprises thickening the continuous phase and stabilizing the latex by the addition thereto of a non-metallic saponaceous substance, without substantial modification of the colloidal condition of the rubber hydrocarbon.

2. The process of treating latex which comprises thickening the continuous phase and stabilizing the latex by the addition thereto of the saponification product of a volatile base and a substance comprising higher aliphatic acid radicals, without substantial modification of the colloidal condition of the rubber hydrocarbon.

3. The process of treating latex which comprises thickening the continuous phase and stabilizing the latex by the addition thereto of the ammonium-base soap of a higher aliphatic acid, without substantial modification of the colloidal condition of the rubber hydrocarbon.

4. The process of treating latex which comprises thickening and stabilizing the latex by the addition thereto of an ammonium soap in excess of five parts on 100 parts of rubber.

5. As a new article, an uncoagulated latex paste containing a saponaceous thickening and stabilizing agent.

6. As a new article, an uncoagulated latex paste thickened and stabilized by a volatile-base saponification product.

7. As a new article, an uncoagulated latex paste thickened and stabilized by an ammonium saponification product.

8. As a new article, an uncoagulated latex paste thickened and stabilized by the volatile-base saponification product of a higher aliphatic acid.

9. As a new article, an uncoagulated latex paste thickened and stabilized by the ammonium saponification product of a higher aliphatic acid.

10. As a new article, an uncoagulated latex paste thickened and stabilized by ammonium stearate.

Signed at New York, county and State of New York, this 24 day of Sept., 1925.

MERWYN C. TEAGUE.